Oct. 25, 1938.  F. H. BOGART  2,134,024
OPERATING MECHANISM FOR MACHINE TOOLS
Filed March 25, 1936   3 Sheets-Sheet 1
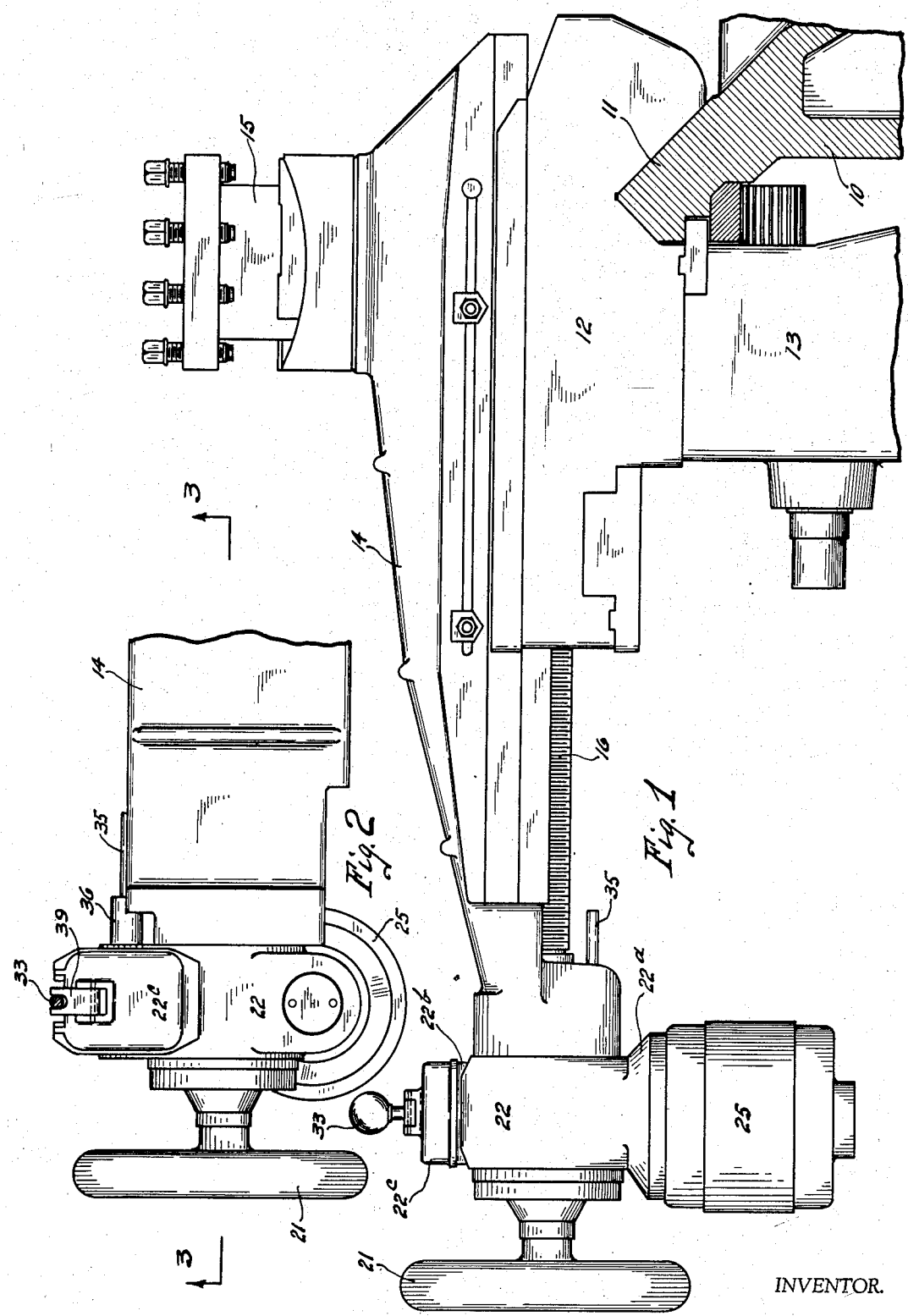
INVENTOR.
FRED H. BOGART
BY Kwis, Hudson & Kent
ATTORNEYS.

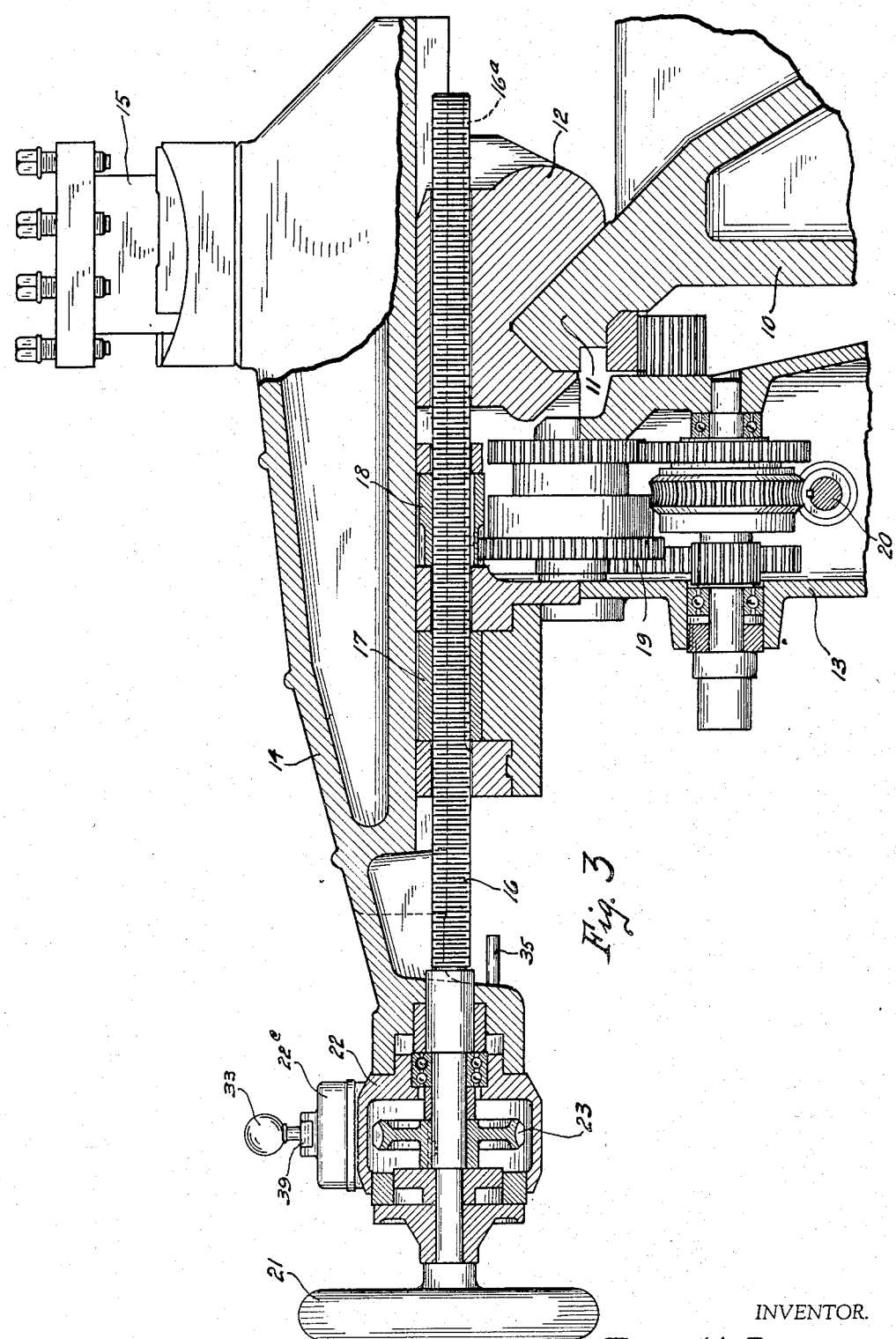

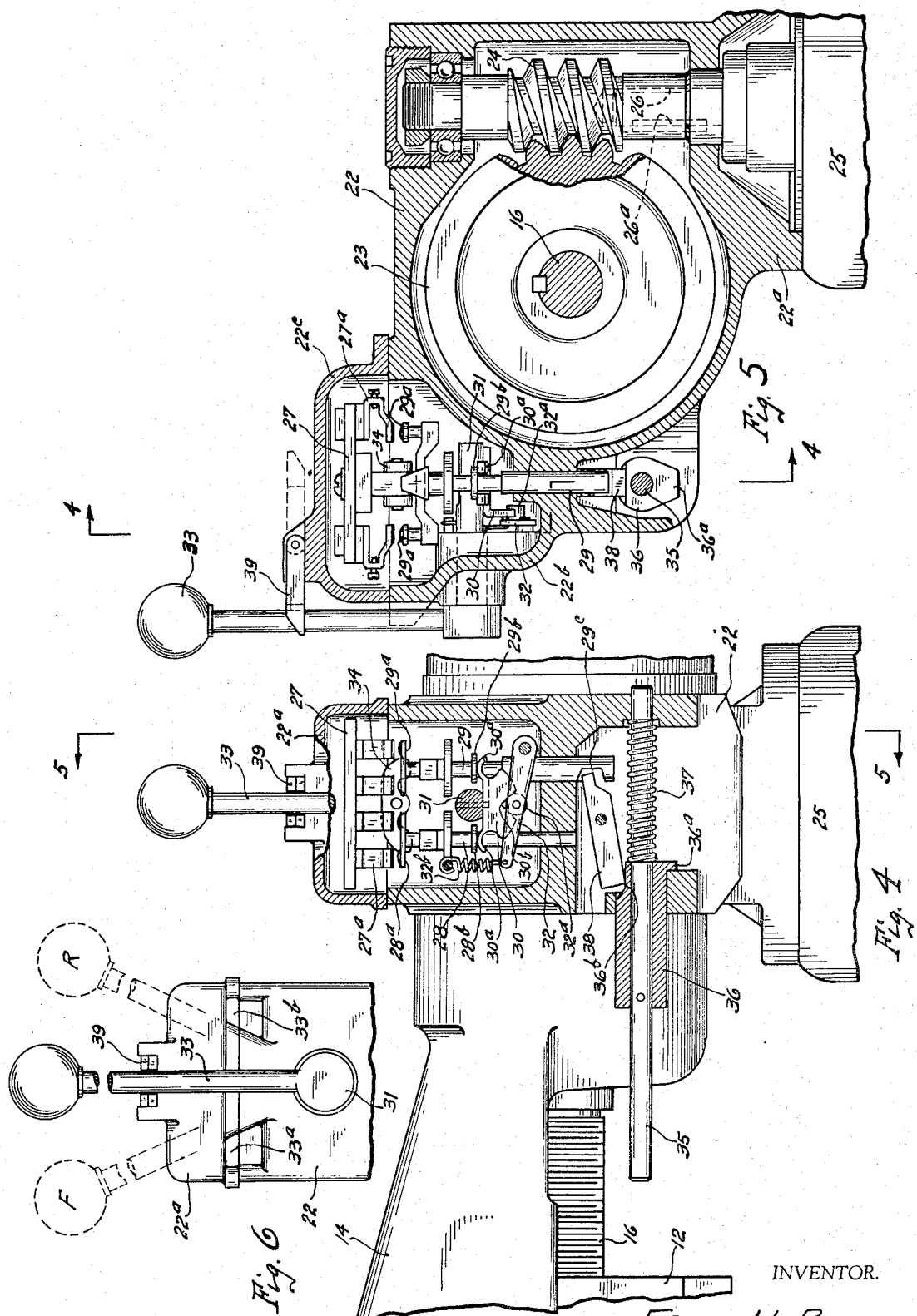

Patented Oct. 25, 1938

2,134,024

UNITED STATES PATENT OFFICE 2,134,024

OPERATING MECHANISM FOR MACHINE TOOLS

Fred H. Bogart, South Euclid, Ohio, assignor to The Warner & Swasey Company, Cleveland, Ohio, a corporation of Ohio Application March 25, 1936, Serial No. 70,825

17 Claims. (Cl. 82—21)

This invention relates to a machine tool, and particularly to a machine tool of the type having a part which is movable in opposite directions.

An object of the invention is to provide a machine tool having a part movable in opposite directions, together with mechanism for moving said part at a slow or feeding rate and which may be manually operated or power operated, and, in addition, is provided with means for imparting a quick power drive to said part and includes a motor that is always operatively connected with said mechanism.

Another object is to provide a machine tool of the character specified in the last named object, and wherein a single means is provided to control the motor for the quick movement of the part.

A further object is to provide a machine tool of the character specified in the last named object, and wherein the control means includes mechanism for automatically stopping the rapid or quick movement of the part in one direction when said part has reached a predetermined point.

A further object is to provide a machine tool having a cross slide and feed mechanism for said cross slide including a feed screw, a separate motor for imparting rapid movement to said cross slide and an unbroken gear train operatively connecting said feed screw and said motor.

Further and additional objects and advantages not hereinbefore specified will become apparent hereinafter during the following detailed description of an embodiment of the invention which is illustrated in the accompanying drawings in which—

Fig. 1 is an end elevational view of the carriage, cross slide and a portion of the apron of a machine tool, with a portion of the bed of the machine being shown in section.

Fig. 2 is a fragmentary top plan view of the left hand portion of the cross slide.

Fig. 3 is a sectional view through the cross slide, carriage and apron and is taken substantially on line 3—3 of Fig. 2 looking in the direction of the arrows.

Fig. 4 is a fragmentary view of a portion of the cross slide, partly in elevation and partly in section, the section being taken substantially on irregular line 4—4 of Fig. 5 looking in the direction of the arrows.

Fig. 5 is a sectional view through the cross slide, taken substantially on line 5—5 of Fig. 4 looking in the direction of the arrows, and Fig. 6 is a fragmentary side elevational view of the cross slide as shown in Fig. 4.

The embodiment of the invention to be described herein relates to the cross slide of a machine tool, but it will be understood that the invention may be applicable to the carriage, turret slide, or other parts of the machine which move in opposite directions.

The machine tool illustrated in the accompanying drawings and disclosing an embodiment of the invention comprises a bed 10 provided with ways 11 upon the front one of which is slidably mounted a carriage 12 for movement toward and away from the head (not shown) of the machine and carries an apron 13 which is supported adjacent its lower end on a guide rail (not shown) formed on the front side of the bed as is well known in the art. The carriage 12 slidably supports the cross slide 14 which carries a turret 15. The movement of the cross slide 14 inwardly and outwardly on the carriage 12 is occasioned by means of a screw 16 rotatably supported in the cross slide and passing through a nut 17 held against axial movement and forming a part of the carriage. A pinion 18 is mounted on the screw 16 and has a key sliding in an elongated keyway 16a formed in the screw. The pinion 18 is held against endwise movement by portions of the carriage and is driven by means of gearing designated generally at 19 and located in the apron, said gearing in turn being driven by the feed shaft 20 which extends longitudinally of the machine along the front of the bed and is operatively connected with the spindle in the head as will be well understood in the art.

Suitable clutch means is interposed between the feed shaft 20 and the gearing 19 for connecting and disconnecting the drive to the screw, as will also be understood. It will be understood when the clutch just referred to is engaged that the screw will be operated through the gearing from the feed shaft for purposes of feeding and that when said clutch is disengaged the screw may be operated manually by means of a hand wheel 21 fixed to the screw at the front end of the slide or by power mechanism now to be described and for the purpose of imparting a quick motion to the cross slide to position the slide between working operations.

The front end of the slide 14 has an enlarged portion 22 forming a housing for a worm wheel 23 keyed to the screw 16 and a steep pitch worm 24 meshing with said worm wheel and rotatably supported in suitable bearings formed in the enlarged portion, see Fig. 5. The enlarged portion or housing 22 on its lower side is provided with a circular flange 22a to which is bolted the casing of a motor 25. The motor spindle 26 projects outwardly of the motor casing and into a bore formed in the worm 24, said spindle and worm being operatively keyed together by a key indicated at 26a in Fig. 5. The motor 25 may be operated in either a forward or reverse direction to drive the screw 16 and thus effect a quicker movement of the slide in either direction than is occasioned by the drive to the screw from the feed shaft 20, whereby a rapid movement can be imparted to the slide to position the same intermediate operative or working positions.

The enlarged portion 22 at the front end of the cross slide is provided at one side with an extension 22b forming a chamber for the control switch for the motor 25, said extension 22b being closed on its upper side by a cover 22c. Any suitable form of control switch may be employed, but at the present time it is believed preferable to employ the switch now to be described. Rigidly mounted in the chamber formed by the extension 22b is a bar 27 carrying adjacent each of its ends four spaced contact members 27a. Slidably mounted in the chamber is a rod 28 that carries at its upper end a contact arm 28a which, when the bar is in its upward position, contacts with and bridges adjacent contact members 27a as will be well understood.

A second slidable rod 29 is also mounted in the chamber and likewise carries at its upper end a contact arm 29a for contacting with and bridging adjacent contact members 27a. The rod 28 is provided with a flange 28b and the rod 29 with a flange 29b which are engaged by curved portions 30a on the horizontal arm of a substantially L-shaped plate 30 that is secured to the flattened side of a rockable shaft 31, as clearly shown in Fig. 4.

It will be seen that when the shaft 31 is rocked the plate 30 will also be rocked and one or the other of the curved arms 30a will act against the flanges 28b and 29b to force either the rod 28 or the rod 29 upwardly to move the contact arms carried thereby into engagement with the contact members 27a.

The lower edge of the vertical arm of the L-shaped plate 30 is curved and is provided intermediate its ends with a V-shaped notch 30b into which is adapted to engage a roller 32a carried by a pivoted lever 32 mounted in the chamber and normally held in its raised position by means of a spring 32b as shown in Fig. 4.

It will be seen when the plate 30 is in the position shown in Fig. 4 that the roller 32a engages in the notch and both contact arms 28a and 29a are out of engagement with the contact members 27a. When this condition exists the control lever 33 carried by the shaft 31 and located exteriorly of the chamber is in the position shown in Fig. 4 or the position indicated in full lines in Fig. 6. When the lever 33 is rocked from its full line position toward the right to dotted line position R in Fig. 6 the rod 28 is moved upwardly by the rocking of the plate 30 and the contact arm 28a is brought into engagement with its cooperating contact members 27a and the circuit is established to the motor for operating the same and moving the slide in the reverse or outward direction.

When the lever 33 is moved from the full line position of Fig. 6 to the left into dotted line position F, the rod 29 is moved upwardly by the rocking movement of the plate 30 and the contact arm 29a engages with its cooperating members 27a to thus operate the motor and move the slide in the forward or inward direction.

It will be noted that the contact arms 28a and 29a will never both be in engagement with their contact members 27a at the same time, since pivoted equalizer arms 34 are employed, wherefore when either one of the rods 28 or 29 is raised the equalizer arms 34 will be rocked, and the other of the rods will be lowered and its contact arm moved out of engagement with its contact members.

In order to automatically stop the inward or forward movement of the slide when it has reached its most inward position a rod 35 is slidably carried by the outer end of the slide and said rod has fixed thereto a bushing 36 which on its inner end is provided with a heel 36a that limits the movement of the rod and bushing in one direction. A spring 37 is mounted on the rod and abuts at one end the bushing 36 and at its opposite end a portion of the housing, said spring acting to urge the bushing and rod toward the left as viewed in Fig. 4, until the heel 36a of the bushing comes into contact with the housing.

The upper side of the bushing is provided with a cam surface 36b upon which bears the lower edge of one end of a pivoted lever 38, the opposite end of which lever is reduced and extends into a recess 29c formed in the lower end of the rod 29. The rod 29, as illustrated in Fig. 4 is in inoperative position with its contact arm 29a disengaged, and it will be understood when said rod is raised to engage its contact arm the lower edge of the reduced end of the lever 38 will engage the lower surface of the recess 29c at which time the motor will be operating and the slide moving forwardly or inwardly. When the slide nears its most inward position the end of the rod 35 contacts with a portion of the carriage and said rod and the bushing 36 are moved to the right as viewed in Fig. 4, against the action of the spring 37, which movement due to the cam surface 36b on the bushing, rocks the lever 38 in a clockwise direction and moves the rod 29 downwardly to disengage the switch, break the circuit to the motor and stop the movement of the slide.

The arrangement just described obviates the danger of the machine being damaged should the operator neglect to move the control lever 33 from dotted line position F into the neutral or full line position when the slide has reached its most inward or forward position.

Suitable stops 33a and 33b may be provided in the form of lugs for limiting the movement of the lever 33 in either the forward or reverse directions, while the cover 22c has hinged thereto a pawl 39 provided with a fork at its outer end for straddling the lever 33 when it is in its neutral or full line position to retain the same in said position, thus preventing accidental movement of the lever.

It will be noted that the driving connection between the motor 25 and the screw 16 is never broken and that when said screw 16 is being driven from the feed shaft 20 or is being operated manually by the hand wheel 21 the worm wheel 23 will rotate the steep pitch worm 24 and this, in turn, will rotate the armature of the motor, but inasmuch as the feeding movement or the hand operated movement is always a slow one, it is immaterial if the armature of the motor is rotated at such times while the motor is idle. On the other hand when it is desired to impart the quick movement to the cross slide to position the same it is merely necessary to move the control lever 33 in the proper direction to close the switch and actuate the motor.

Although a preferred embodiment of the invention has been illustrated and described herein, it should be understood that the invention is susceptible of various modifications and adaptations within the scope of the appended claims.

Having thus described my invention I claim:

1. In a machine tool having a part movable in opposite directions, mechanism for moving said part at a relatively slow rate of movement, and means carried by said part for moving the same at a relatively fast rate of movement, an unbroken drive train between said means and said mechanism, and means for rendering said first named means active or inactive.

2. In a machine tool having a part movable in opposite directions, mechanism for moving said part at a relatively slow rate of movement, and means carried by said part for moving the same at a relatively fast rate of movement and including a motor, an unbroken drive train between said motor and said mechanism, and means for rendering said motor active or inactive.

3. In a machine tool having a part movable in opposite directions, mechanism for moving said part at a relatively slow rate of movement and including a screw, and means carried by said part for moving the same at a relatively fast rate of movement, an unbroken drive train between said means and said screw, and means for rendering said first named means active or inactive.

4. In a machine tool having a part movable in opposite directions, mechanism for moving said part at a relatively slow rate of movement and including a screw, and means carried by said part for moving the same at a relatively fast rate of movement and including a motor, an unbroken drive train between said motor and said screw, and means for rendering said motor active or inactive.

5. A machine tool having a part movable in opposite directions, mechanism for moving said part at a relatively slow rate of movement, and means carried by said part for moving the same at a relatively fast rate of movement, an unbroken drive train between said means and said mechanism, and a single control member for controlling the direction of movement of said part at said fast rate, and for rendering said first means active or inactive.

6. A machine tool having a part movable in opposite directions, mechanism for moving said part at a relatively slow rate of movement, and means carried by said part for moving the same at a relatively fast rate of movement and including a motor and a control member for controlling the operation of said motor, and an unbroken drive train between said motor and said means.

7. A machine tool having a part movable in opposite directions, mechanism for moving said part at a relatively slow rate of movement and including a screw, and means carried by said part for moving the same at a relatively fast rate of movement and including a motor, and a control member for controlling the operation of said motor, and an unbroken drive train between said motor and said screw.

8. A machine tool having a cross slide, feeding mechanism for said cross slide including a power source, and independent power means carried by said cross slide for moving the same at a relatively fast rate of movement, an unbroken drive train between said independent power means and said mechanism, and means for rendering said independent power means active or inactive.

9. A machine tool having a cross slide, feeding mechanism for moving said slide and including a screw, and means carried by said slide for moving the same at a relatively fast rate of movement and including a motor, an unbroken drive train between said motor and said screw, and means for controlling said motor.

10. A machine tool having a cross slide, feed mechanism for the same, and means carried by said slide for moving the same at a relatively fast rate of movement and including a single member for controlling the direction of operation of said means and for rendering the same active or inactive, and an unbroken drive train between said means and said mechanism.

11. A machine tool having a part movable in opposite directions, power operated means for moving said part and including a clutch, a gear train, and a screw operated by said train, means for moving said part at a relatively fast rate of movement and including a motor having a worm on its spindle meshing with a worm wheel fixed to said screw and means for controlling said motor.

12. A machine tool having a part movable in opposite directions, mechanism for moving said part at a relatively slow rate of movement, means for moving said part at a relatively fast rate of movement and including a motor having an unbroken operative connection with said mechanism, and means for automatically stopping the fast movement of said part at a predetermined point in its movement in one direction.

13. A machine tool having a slide, feed mechanism for said slide, means for moving said slide at a relatively fast rate of movement including a motor and an unbroken operative connection between said motor and said mechanism, and means for automatically stopping said motor at a predetermined point in the fast movement of said slide in one direction.

14. A machine tool having a part movable in opposite directions, mechanism for moving said part at a relatively slow rate of movement, and means for moving said part at a relatively fast rate of movement and including a motor having an unbroken operative connection with said mechanism, a control switch for said motor to control the starting, stopping and reversing of the relatively fast movement of said part, and means for automatically controlling said switch to stop the movement of said part in a predetermined position.

15. A machine tool having a movable part, feed mechanism for said part, and means for moving said part at a relatively fast rate of movement and including a motor having a shaft, and means providing an unbroken driving operative connection between said shaft and said mechanism, said shaft due to the unbroken operative connection idly rotating when said part is moved by said feed mechanism.

16. In a machine tool having a slide movable in opposite directions, a gear train for moving said slide in one direction to impart a feeding movement thereto, power means for operating said gear train, a motor, a second and unbroken gear train operatively connecting said electric motor with said first named gear train for moving said slide in the opposite direction at a relatively fast rate of movement, and means for rendering said motor active or inactive.

17. In a machine tool having a slide movable in opposite directions, a screw for moving said slide, a gear train for driving said screw in one direction to impart a feeding movement to said slide, power means for operating said gear train, auxiliary power means, a second and unbroken gear train operatively connecting said auxiliary power means with said screw for driving the same in a reverse direction to impart a rapid return movement to said slide, and means for rendering said auxiliary power means active or inactive.

FRED H. BOGART.